Patented May 24, 1932

1,859,653

UNITED STATES PATENT OFFICE

AUGUSTUS EDWARD CRAVER, OF MOUNT VERNON, NEW YORK, ASSIGNOR TO WEISS AND DOWNS, INC., OF NEW YORK, N. Y., A CORPORATION OF NEW YORK

CHEMICAL COMBINATION OF BORIC ACID AND POTASSIUM ACID TARTRATE, AND PROCESS OF PREPARING SAME

No Drawing.     Application filed January 7, 1930. Serial No. 419,204.

In the course of many diseases, the urine which is normally slightly acid, becomes alkaline, resulting in the precipitation of calcium and magnesium phosphates in the form of a whitish sediment in the urine. This condition is usually termed phosphaturia by the medical profession. It is realized that phosphaturia is a symptom rather than a disease and that it is primarily due to an alkaline condition, which may cause other disorders, such as infantile tetany. To correct abnormal urinary alkalinity, various materials such as ammonium chloride, sodium acid phosphate and various acids have been employed as urinary acidifiers but with such of these materials as are efficacious, the dosage necessary for relief is so large as to produce untoward results, especially gastric disturbances, so that they cannot be continuously administered over any but short periods.

My invention resides in the discovery that very efficient urinary acidifiers may be produced when boric acid is caused to react in a special manner with an alkali metal acid salt of tartaric acid or tartaric acid itself in the presence of an alkali metal hydroxide or carbonate, and the reaction product recovered in a special manner. These new urinary acidifiers, the preparation of which I shall presently describe, are taken internally through the mouth either in powdered form or in solution. They effectively render the urine acid, thereby keeping the alkaline earth phosphates in solution and thus control the phosphaturia. They are also efficacious in other abnormal conditions due to alkalosis where phosphaturia is not necessarily the symptom. It has been found that in the usual doses of 20-30 grains, three times per day necessary for the relief of aggravated cases of phosphaturia, these new urinary acidifiers are well tolerated by the stomach and have been administered continuously over extended periods without any untoward results.

In order to describe the invention, various examples illustrating the procedure used to prepare these novel urinary acidifiers are given. In all examples the parts given are by weight. I do not, however, intend to limit myself strictly to the details and proportions of these examples and they are given for illustrative purposes only.

Example 1

1217 parts of potassium acid tartrate and 1750 parts of water are placed in an apparatus which can be heated so as to avoid local superheating, as for example, an agitated oil jacketed enamel lined pot and the oil in the jacket heated. When the temperature of the mixture in the pot reaches about 40° C., about 430 parts of boric acid are added. From 400 to 450 parts of boric acid have given satisfactory results. The heating of the oil bath is continued at such a rate that the boiling point (about 102° C.) of the mixture in the pot is reached in about one hour. The boiling of the mixture is continued for about 1¼ hours longer or until its temperature reaches about 105° C. During this heating and boiling, a water loss of about 1500-1600 parts should have occurred due to evaporation losses. The clear syrupy liquid now in the pot is cooled to about 80° C. and 450 parts of water are added, followed by agitation for 15 minutes after which at about 55° C., 700 parts of water are added. The liquid is now filtered. The specific gravity of the filtrate should be about 1.25-1.35 at 21° C. This filtrate is strongly cooled in an ice bath and 850 parts of ethanol are gradually added during vigorous agitation. The precipitate formed is then filtered, washed with a small amount of ethanol and finally air dried, after which it is ground to a fine powder and is now ready to be used as a urinary acidifier.

Example 2

1217 parts of potassium acid tartrate, 1750 parts of water and 400 parts of boric acid are placed in a pot of the same type as described in Example #1 and heated so that the mixture in the pot reaches the boiling point of about 101° C. in about one hour. The boiling is continued about 15 minutes longer or until the boiling temperature reaches about 102° C., after which the liquid is filtered. The filtrate should have a specific gravity of 1.25-1.35 at 21° C. It is strongly cooled and 800 parts of ethanol are then added in small portions at a time while thoroughly agitated. The white precipitate thus formed is filtered on a vacuum filter, washed and finally ground to a fine powder.

Example 3

971 parts of tartaric acid, 425 parts of boric acid and 1700 parts of water are placed in a pot of the same type as described in Example #1 and heated. When the mixture in the pot reaches about 50° C., 363 parts of potassium hydroxide are added and the oil heated up to about 160° C. After about one hour the mixture in the pot should reach a boiling temperature of 101° C. The boiling is continued for about 15 minutes longer or until the boiling temperature reaches about 102° C., after which the liquid is filtered. The filtrate is strongly cooled and 825 parts of ethanol are then added in small portions during vigorous agitation. The white precipitate thus formed is then filtered, preferably washed with ethanol and finally air dried, after which it is ground to a fine powder.

The urinary acidifiers obtained in the above examples are white amorphous powders, very soluble in water, insoluble in alcohol. If 10 grams are placed in 25 cc. of water and heated to boiling, a clear solution results which shows no separation of solids after cooling to room temperature. On evaporation of the solution, no separation of crystals occurs during the evaporation and the mass goes through a syrupy stage in which it is homogeneous at all times. Finally, on continued evaporation a glassy amorphous mass results. A solution of 10 grams of the air dried powder in 25 grams of water shows a hydrogen ion concentration equivalent to a pH of 3.0–3.5. These materials have a distinct buffer action since in solutions five times as dilute as the above concentration the pH remains the same, which explains in some measure the efficiency of these new urinary acidifiers.

The moisture content of the air dried powders obtained in the above examples amounts to about 10–13%. The content of boron (calculated as $B_2O_3$) on the dry basis amounts to 16–18% determined gravimetrically. It has been found that one gram (on the dry basis) of these new urinary acidifiers when dissolved in water requires 92–95 cubic centimeters of one-tenth normal potassium hydroxide for neutralization when titrated in the presence of mannite, using phenolphthalein as the indicator.

While I have given examples in which boric acid is caused to react with either potassium acid tartrate or tartaric acid in the presence of caustic potash, it is understood that similarly, boric acid may be caused to react with either sodium acid tartrate or tartaric acid in the presence of caustic soda or soda ash using the same technique given in the examples, correction being made, of course, for the difference in the molecular weights of the corresponding sodium and potassium compounds. The corresponding sodium derivatives thus obtained have similar properties to the potassium derivatives described above, but the actual per cent. of $B_2O_3$ and the titration value with one-tenth normal potassium hydroxide, on the dry basis are, of course, greater than the potassium derivatives due to the difference in the atomic weights of sodium and potassium.

When these products are used as urinary acidifiers it has been found that about 90% of the boron is eliminated by the kidneys.

I claim:

1. A urinary acidifier comprising a chemical combination of boric acid with potassium acid tartrate, said urinary acidifier having a boron trioxide content within the limits of 16 and 18% on the dry basis, and having a hydrogen ion concentration in aqueous solution equivalent to a pH of 3.0 to 3.5 and being substantially free from unreacted potassium acid tartrate.

2. A urinary acidifier comprising a chemical combination of boric acid with potassium acid tartrate, said urinary acidifier, on the dry basis, having a boron trioxide content of 16 to 18% and requiring 92 to 95 cubic centimeters of one-tenth normal potassium hydroxide for neutralization per gram in the presence of mannite and having a hydrogen ion concentration in aqueous solution equivalent to a pH of 3.0 to 3.5, and further characterized by being amorphous, very soluble in water and insoluble in alcohol and being substantially free from unreacted potassium acid tartrate.

3. A urinary acidifier comprising a chemical combination of boric acid with potassium acid tartrate, said urinary acidifier having a boron trioxide content within the limits of 16 and 18% on the dry basis and being substantially free from unreacted potassium acid tartrate.

4. A urinary acidifier comprising a chemical combination of boric acid with potassium acid tartrate, said urinary acidifier, on the dry basis, having a boron trioxide content of 16 to 18% and requiring per gram, 92 to 95 cubic centimeters of one-tenth normal potassium hydroxide for neutralization in the presence of mannite and being substantially free from unreacted potassium acid tartrate.

5. A urinary acidifier comprising a chemical combination of boric acid with potassium acid tartrate, said urinary acidifier, on the dry basis, having a boron trioxide content of 16 to 18% and requiring 92 to 95 cubic centimeters of one-tenth normal potassium hydroxide for neutralization per gram in the presence of mannite and further characterized by being amorphous, very soluble in water and insoluble in alcohol and being substantially free from unreacted potassium acid tartrate.

6. Process of preparing a urinary acidifier comprising boiling a mixture of 400 to 450 parts of boric acid with 1217 parts of potassium acid tartrate in 1750 parts of water until a boiling point of about 105° C. is reached after about two and one-quarter hours of heating during which time a loss of about 1500 to 1600 parts occurs from water evaporation, diluting with about 1150 parts of water, cooling to ordinary temperature, filtering, strongly cooling the filtrate, precipitating out the product by adding about 850 parts of alcohol, filtering the precipitate, washing it with alcohol and finally air drying it.

7. Process of preparing a urinary acidifier, comprising the steps of heating a mixture of 400–450 parts of boric acid with 1217 parts of potassium acid tartrate in 1750 parts of water until the resulting solution reaches a boiling point of about 101° C. in about one hour and about 102° C. in about one-quarter hour longer, filtering the syrupy solution thus formed, strongly cooling the filtrate and precipitating the product contained therein by means of alcohol, filtering the product, washing it with alcohol and finally drying said product.

8. Process of preparing a urinary acidifier, comprising the steps of boiling a mixture of 400–450 parts of boric acid with 1217 parts of potassium acid tartrate in 1750 parts of water until the resulting solution possesses a specific gravity of 1.25 to 1.35 at 21° C., filtering the solution, followed by cooling and precipitating out the product formed by means of alcohol, followed by filtering, washing with alcohol and drying said product.

9. Process of preparing a urinary acidifier, comprising the steps of boiling a mixture of 430 parts of boric acid with 1217 parts of potassium acid tartrate in 1750 parts of water until the resulting solution possesses a specific gravity of 1.25 to 1.35 at 21° C., filtering the solution, followed by cooling and precipitating out the product formed by means of alcohol, followed by filtering, washing with alcohol and drying said product.

10. Process of preparing a urinary acidifier, comprising the steps of boiling a mixture of 400–450 parts of boric acid with 1217 parts of potassium acid tartrate in 1750 parts of water until the resulting solution possesses a specific gravity of 1.25 to 1.35 at 21° C., filtering the solution, followed by cooling and precipitating out the product formed by means of alcohol, followed by filtering and drying said product.

11. Process of preparing a urinary acidifier, comprising the steps of boiling a mixture of 430 parts of boric acid with 1217 parts of potassium acid tartrate in 1750 parts of water until the resulting solution possesses a specific gravity of 1.25 to 1.35 at 21° C., filtering the solution, followed by cooling and precipitating out the product formed by means of alcohol, followed by filtering and drying said product.

In testimony whereof, I hereby affix my signature.

AUGUSTUS EDWARD CRAVER.